March 6, 1928.
T. F. McLAUGHLIN
SHUT-OFF VALVE
Filed Sept. 24, 1923
1,661,437
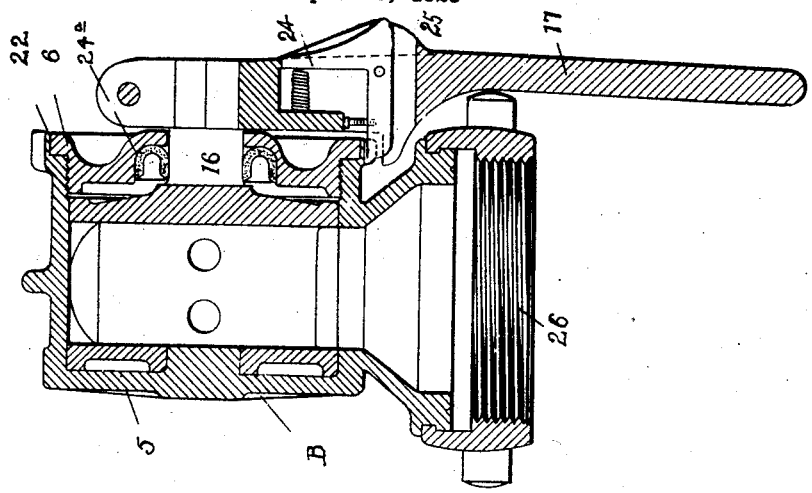
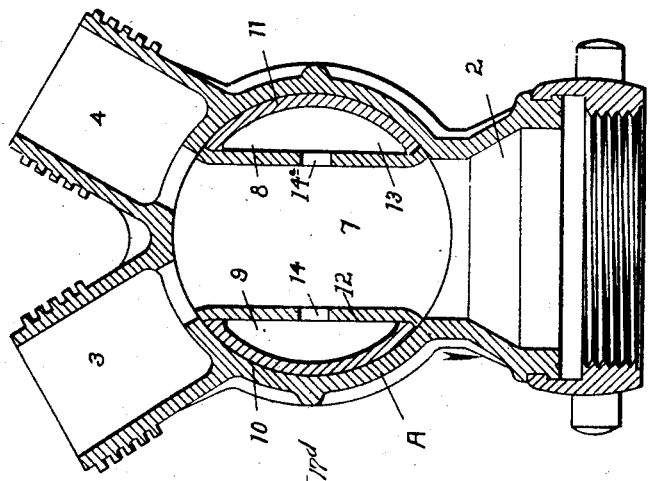
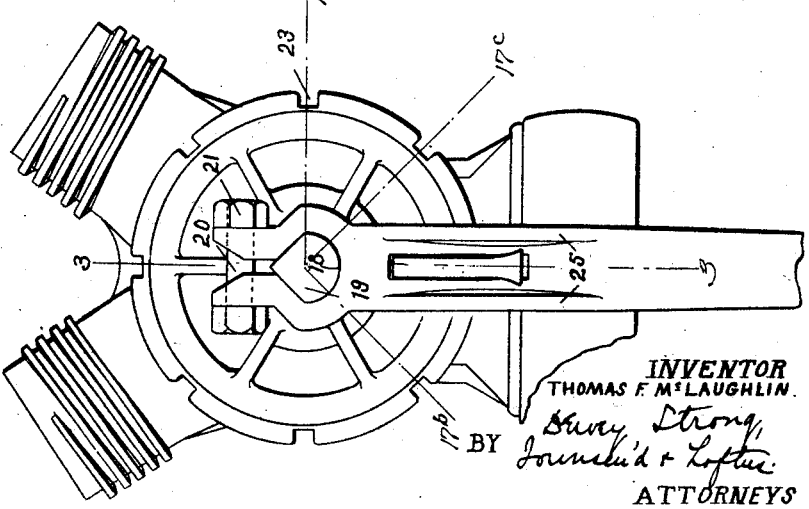
INVENTOR
THOMAS F. McLAUGHLIN.
BY
ATTORNEYS Patented Mar. 6, 1928.

1,661,437

UNITED STATES PATENT OFFICE.

THOMAS F. McLAUGHLIN, OF SAN FRANCISCO, CALIFORNIA.

SHUT-OFF VALVE.

Application filed September 24, 1923. Serial No. 664,403.

This invention relates to a valve and especially to shut-off valves such as are employed in water piping systems, etc.

The object of the present invention is to generally improve and simplify the construction and operation of valves of the character described; to provide a valve which may be designed for straight-way or two-way service; a valve which may be subjected to pressure from either side; a valve in which packing glands, etc., are reduced to a minimum; a valve in which engagement between the valve and the seat is automatically maintained by hydraulic pressure when the valve assumes closed position; and further, a valve which may be locked in any position desired, and which is provided with means on its exterior surface for visibly indicating the position of the valve.

One form which my invention may assume is exemplified in the following description and illustrated in the accompanying drawings, in which—

Fig. 1 is an end view of a two-way shut off valve.

Fig. 2 is a central vertical section of the same.

Fig. 3 is a cross-section taken on line 3—3, Fig. 1.

Referring to the drawings in detail, A indicates a valve casing which in this instance is provided with a main inlet connection such as indicated at 2, and a pair of discharge connections such as indicated at 3 and 4. The central portion of the valve casing is cylindrical in shape, one end being permanently closed by a head member 5 which is cast integral with the main casing. The opposite end is open and interiorly threaded for the reception of a removable head member such as indicated at 6. Disposed between the head members 5 and 6 within the cylindrical central chamber of the valve casing is the valve proper generally indicated at B. This valve is provided with a central discharge port 7 which may be turned to assume a closed position or turned to register with either or both of the discharge connections 3 and 4.

Formed on each side of the valve are pockets such as indicated at 8 and 9, and adapted to be received by the pockets is a pair of shoes, one being indicated at 10 and one at 11. These shoes form the function of packing members as will hereinafter be described, and it may further be stated that they are hydraulically actuated and as such automatically maintain a close contact with the interior surface of the central cylindrical chamber.

The shoes extend from end to end of the valve and each forms a segment of a circle. A pair of pressure chambers is thus formed as shown at 12 and 13, and these chambers are in communication with the central passage 7 through means of ports 14 and 14$^a$ formed in the valve. When the valve is turned to closed position, the shoe indicated at 10 will be subjected to the pressure of the water entering through the connection 2 and thus will be forced inwardly against the valve. A slight amount of leakage will thus take place and this leakage water will leak around the ends of the shoe and will enter the central discharge passage 7. It will here gradually accumulate and will flow through the port 14$^a$ into the pressure chamber 9, where it will build up a pressure equal to the inlet pressure. This pressure will be exerted outwardly on the shoe 11 and this will thus be held in snug contact with the interior surface of the valve chamber, thus preventing leakage through the discharge connections indicated at 3 and 4. If the valve is turned to either of the open positions, one shoe or the other will be forced outwardly to close the cooperating discharge passage as the ports 14 and 14$^a$ are then in direct communication with the inlet connection; this being also true if the valve is turned to complete open position as shown in Fig. 2. Pressure in the chambers 8 and 9 is, however, of no importance at this time as the water is freely admitted and discharged. The shoes shown at 10 and 11 extend from end to end of the valve and they will naturally turn in unison with the valve as they are locked with relation thereto, so as to move circumferentially in unison with the same; that is, angular shoulders are provided at each end of each shoe as shown at 15, and these shoulders form a lock between the respective shoes and the valve which insures turning movement of the shoes in unison with the valve.

For the purpose of transmitting turning movement to the valve, a stem 16 is provided. This stem is extended through the removable head 6 and a lever 17 is secured on the outer end thereof. The end of the stem 16 which receives the lever is half round as indicated at 18, while the remaining portion is V-shaped as indicated at 19. The head on the lever which surrounds the stem is similarly shaped and it is split as at 20 to be securely clamped when applied, and to permit it to be rigidly secured by means of a bolt 21.

The end of the valve casing adjacent the head 6 is provided with a circumferential flange 22. This flange is provided with a series of notches as indicated at 23, and these notches are adapted to be engaged by a spring actuated latch generally indicated at 24; this latch serving the function of locking the valve in any of the open positions or in its closed position. The lever assumes the position shown in Figs. 1 and 3 when the valve is completely open. The lever assumes the position shown by dotted line at 17ᵇ when the discharge connection 4 is open and the dotted line position indicated at 17ᶜ when the discharge connection 3 is open the lever being turned to assume a horizontal position, or that indicated by the dotted line 17ᵈ, when the valve is closed. In other words, the position of the handle indicates the position of the valve, as the lever always aligns with the discharge connection that is open, and assumes a central position when both discharge connections are open. It otherwise assumes a cross position when closed and thus visibly indicates the position of the valve.

All leakage through the discharge connections is taken care of by the hydraulically actuated shoes shown at 10 and 11, and leakage around the stem 16 is taken care of by a cup-leather such as shown at 24ᵃ, (see Fig. 3). The number of parts to be packed and the quantity of packing material employed are therefore reduced to a minimum, and accordingly require comparatively little care and attention. The valve is furthermore free to operate as a free turning fit may be maintained between the valve and the casing.

It will be noted that the valve may be held in any of its open positions or when in closed position, and it will also be noted that the spring actuated latch which retains the valve in position is disposed between a pair of upwardly projecting flanges or ribs 25. This is of importance as it prevents the latch from being damaged by being struck or otherwise, and it furthermore prevents accidental release of the same. The V-shaped end of the valve stem 16 is a useful and important feature as it prevents wrong positioning of the valve lever. Another feature which might be mentioned is the swivel connection generally indicated at 26. This connection permits the valve to be readily attached wherever required and to be turned to assume any position desired in order to limit excess movement of the latch and particularly to adjust the latch so that the handle end indicated by the numeral 24 will lie substantially flush with the outer surface of the handle, an adjusting screw is employed as indicated at 27.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. In a valve of the character described, a casing, a valve turnably mounted therein, a stem projecting through one end of the casing, a handle secured on the stem for imparting a turning movement to the valve, a plurality of notches formed in one end of the casing, said valve handle having an opening formed therein at a point intermediate the valve stem and the outer end of the handle and extending through the handle, an inwardly extending latch member pivotally mounted in the opening of the handle and engagable with the notches, and an extension on the latch member lying in the opening and assuming a position in substantial parallelism with the surface of the handle, said extension when depressed adapted to release the latch with relation to the notches and a spring interposed between the extension and the handle to normally retain the latch in engagement with the notches.

2. In a valve of the character described, a casing, a valve turnably mounted therein, a stem projecting through one end of the casing, a handle secured on the stem for imparting a turning movement to the valve, a plurality of notches formed in one end of the casing, said valve handle having an opening formed therein at a point intermediate the stem and the outer end of the handle and extending through the handle, an inwardly extending latch member pivotally mounted in the opening of the handle and engagable with the notches, an extension on the latch member lying in the opening and assuming a position in substantial parallelism with the surface of the handle, said extension when depressed adapted to release the latch with relation to the notches and a spring interposed between the extension and the handle to normally retain the latch in engagement with the notches, and an adjusting screw secured to the latch member and adjustable to limit the movement of the latch with relation to the notches.

THOMAS F. McLAUGHLIN.